US012036777B2

(12) United States Patent
Yun et al.

(10) Patent No.: US 12,036,777 B2
(45) Date of Patent: Jul. 16, 2024

(54) MULTILAYER STRUCTURES AND ARTICLES COMPRISING THE SAME

(71) Applicant: Dow Global Technologies LLC, Midland, MI (US)

(72) Inventors: Xiao Bing Yun, Shanghai (CN); Jianping Pan, Shanghai (CN); Gang Wang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 572 days.

(21) Appl. No.: 15/564,134

(22) PCT Filed: Jul. 31, 2015

(86) PCT No.: PCT/CN2015/085647
§ 371 (c)(1),
(2) Date: Oct. 3, 2017

(87) PCT Pub. No.: WO2017/000339
PCT Pub. Date: Jan. 5, 2017

(65) Prior Publication Data
US 2018/0099492 A1    Apr. 12, 2018

(30) Foreign Application Priority Data

Jun. 30, 2015  (WO) ................ PCT/CN2015/082845

(51) Int. Cl.
*B32B 27/32* (2006.01)
*B29C 48/00* (2019.01)
(Continued)

(52) U.S. Cl.
CPC .......... *B32B 27/32* (2013.01); *B29C 48/0018* (2019.02); *B29C 48/022* (2019.02);
(Continued)

(58) Field of Classification Search
CPC ....... B29C 48/022; B29C 48/21; B29C 55/06; B29C 48/08; B29C 48/0018; B29C 55/12;
(Continued)

(56) References Cited

U.S. PATENT DOCUMENTS

| 5,430,111 A * | 7/1995 | Recchia .................... C08F 8/44 |
|---|---|---|
| | | 525/329.9 |
| 6,689,857 B1 | 2/2004 | Larter et al. |

(Continued)

FOREIGN PATENT DOCUMENTS

| AU | 198945357 | 6/1990 |
|---|---|---|
| AU | 763745 B2 | 7/2003 |

(Continued)

OTHER PUBLICATIONS

EP15896869.3, Extended Search Report and Written Opinion with a mailing date of Dec. 19, 2018.

(Continued)

*Primary Examiner* — Samir Shah (57) ABSTRACT

Embodiments of the present invention relate to multilayer structures and articles formed therefrom. In one aspect, a multilayer structure comprises (a) a biaxially oriented polyethylene film comprising a linear low density polyethylene having a density of 0.910 to 0.940 g/cm$^3$, wherein the ultimate elongation in the machine direction of the biaxially oriented polyethylene film is at least 2 times greater than the ultimate elongation in the cross direction, and wherein the ultimate tensile strength of the biaxially oriented polyethylene film is at least 60 MPa in at least one of the machine direction and the cross direction; (b) an adhesive layer; and (c) a sealant film, wherein the ultimate elongation of the sealant film is at least 300% in at least one of the machine direction and the cross direction, wherein the ultimate tensile strength of the sealant film is less than 50 MPa in at least one of the machine direction and the cross direction, and (Continued)

wherein the sealant film has a heat seal initiation temperature of 105° C. or less; wherein the sealant film is laminated to the biaxially oriented polyethylene film by the adhesive. In some embodiments, the sealant film comprises at least one layer comprising at least 30 percent by weight of a polyolefin plastomer, a polyolefin elastomer, an ultra low density polyethylene, an ethylene acetate copolymer, an ethylene acrylic acid copolymer, or an ethylene acrylate copolymer.

18 Claims, 1 Drawing Sheet

(51) Int. Cl.
| | | |
|---|---|---|
| B29C 48/08 | (2019.01) | |
| B29C 48/21 | (2019.01) | |
| B29C 55/06 | (2006.01) | |
| B29C 55/12 | (2006.01) | |
| B32B 7/04 | (2019.01) | |
| B32B 7/12 | (2006.01) | |
| B32B 27/08 | (2006.01) | |
| B32B 27/30 | (2006.01) | |
| B32B 27/36 | (2006.01) | |
| B29C 55/28 | (2006.01) | |

(52) U.S. Cl.
CPC .............. *B29C 48/08* (2019.02); *B29C 48/21* (2019.02); *B29C 55/06* (2013.01); *B29C 55/12* (2013.01); *B32B 7/04* (2013.01); *B32B 7/12* (2013.01); *B32B 27/08* (2013.01); *B32B 27/304* (2013.01); *B32B 27/308* (2013.01); *B32B 27/327* (2013.01); *B32B 27/36* (2013.01); *B29C 55/28* (2013.01); *B32B 2270/00* (2013.01); *B32B 2274/00* (2013.01); *B32B 2307/31* (2013.01); *B32B 2307/518* (2013.01); *B32B 2307/54* (2013.01); *B32B 2307/72* (2013.01); *B32B 2307/732* (2013.01); *B32B 2553/00* (2013.01)

(58) Field of Classification Search
CPC ......... B29C 55/28; B32B 7/12; B32B 27/308; B32B 27/327; B32B 27/304; B32B 27/36; B32B 27/32; B32B 7/04; B32B 27/08; B32B 2553/00; B32B 2307/31; B32B 2307/732; B32B 2307/72; B32B 2274/00; B32B 2307/54; B32B 2270/00; B32B 2307/518
See application file for complete search history.

(56) References Cited

U.S. PATENT DOCUMENTS

| | | | |
|---|---|---|---|
| 2004/0173491 A1* | 9/2004 | Buelow | B32B 27/32 |
| | | | 206/484 |
| 2007/0110997 A1† | 5/2007 | Aguirre | |
| 2009/0297810 A1† | 12/2009 | Fiscus | |
| 2013/0011669 A1† | 1/2013 | Lu | |
| 2013/0164516 A1† | 6/2013 | Hausmann | |

FOREIGN PATENT DOCUMENTS

| | | | |
|---|---|---|---|
| EP | 0292894 | A2 | 11/1988 |
| EP | 2750863 | B1 † | 7/2014 |
| JP | H0493249 | A † | 3/1992 |
| WO | 2001085448 | A1 | 11/2001 |
| WO | 2009105938 | A1 † | 9/2009 |
| WO | 2013029223 | A1 | 3/2013 |
| WO | 2013059114 | A1 | 4/2013 |
| WO | 2014072403 | A1 | 5/2014 |
| WO | 2015138096 | A1 | 9/2015 |
| WO | 2015154253 | A1 | 10/2015 |
| WO | 2016090633 | A1 | 6/2016 |

OTHER PUBLICATIONS

Striegel, Liquid Chromatography, 2009, 2nd Ed., p. 242 and 263).
PCT/CN2015/085647, International Search Report and Written Opinion with a mailing date of Apr. 7, 2016.
PCT/CN2015/085647, International Preliminary Report on Patentability with a mailing date of Jan. 11, 2018.
Bruckner Serv Tech, GmbH, Forward-looking tests on standard BOPP line: First results for BOPE film production; Potential Marks for BOPE, pp. 1 and 2, Apr. 2009, Bruckner Serv Tech, GmbH, https://www.brueckner.com/fileadmin/user_upload/downloads/bulletin6_3_BOPE.pdf.†
Guangdong Decro Film New Materials co., ltd., Decro BOPE Physical Data Sheet, p. 1, 2012, Guangdong Decro Film New Materials co., ltd., http://www.boppcn.com/productshow.asp?ID=26&SortID=4&Sequence=311, select Information, and then select Technics.†
Borealis GmbH, Borstar PE for Blown Film Applications, pp. 1-36, 2007, Borealis GmbH, https://www.fist.si/datoteke/navigacija/Borstar.pdf.†
Borealis AG, PO Blown Film Solutions for Flexible Packaging, pp. 1-35, 2013, Borealis AG, https://www.borealisgroup.com/polyolefins/consumer-products/flexible-packaging/blown-film.†
Simone Vigano, The Use of Metallocene Polyethylene in Co-Extruded Lamination Film, pp. 1-9, 2007, Tappi http://www.tappi.org/content/events/07europlace/papers/07europl48.pdf.†

\* cited by examiner
† cited by third party

MULTILAYER STRUCTURES AND ARTICLES COMPRISING THE SAME

FIELD

The disclosure relates to multilayer structures and to articles comprising such multilayer structures.

INTRODUCTION

Orientation is a common method to improve the physical strength of polymers. Certain biaxially oriented polyethylene ("BOPE") films have been used to provide toughness and clarity, which are favorable for down gauging in flexible packaging applications. However, biaxial orientation processes negatively impact heat seal performance of film, especially its heat seal initiation temperature. Previous approaches have included coextruding a BOPE film layer and a sealant layer using a tie layer. However, such approaches are narrowed by the limited resins and structures that are available as tie and sealant layers and that may not be applicable for common three-layer film extrusion lines.

Other approaches involve laminating a BOPE film with a common polyethylene film, which while sometimes providing good physical properties, also have very narrow sealing windows and tend to develop wrinkles during heat sealing that could later lead to bad packaging appearance, or even package failure. Therefore, additional structures for use in packaging applications which can provide improved physical properties and good heat seal performance would be beneficial.

SUMMARY

The present invention provides multilayer structures that comprise a biaxially oriented polyethylene film and a sealant film which advantageously provide one or more desirable properties. For example, in some embodiments, the multilayer structures can advantageously provide a combination of desirable physical properties (e.g., tensile strength, elongation and/or others) and desirable heat seal performance.

In one aspect, the present invention provides a multilayer structure that comprises (a) a biaxially oriented polyethylene film comprising a linear low density polyethylene having a density of 0.910 to 0.940 g/cm$^3$, wherein the ultimate elongation in the machine direction of the biaxially oriented polyethylene film is at least 2 times greater than the ultimate elongation in the cross direction when measured according to ASTM D882, and wherein the ultimate tensile strength of the biaxially oriented polyethylene film is at least 60 MPa in at least one of the machine direction and the cross direction when measured according to ASTM D882; (b) an adhesive layer; and (c) a sealant film, wherein the ultimate elongation of the sealant film is at least 300% in at least one of the machine direction and the cross direction when measured according to ASTM D882, wherein the ultimate tensile strength of the sealant film is less than 50 MPa in at least one of the machine direction and the cross direction when measured according to ASTM D882, and wherein the sealant film has a heat seal initiation temperature of 105° C. or less; wherein the sealant film is laminated to the biaxially oriented polyethylene film by the adhesive.

In another aspect, the present invention provides a multilayer structure that comprises (a) a biaxially oriented polyethylene film comprising a linear low density polyethylene having a density of 0.910 to 0.940 g/cm$^3$; (b) an adhesive layer; and (c) a sealant film comprising at least one layer comprising at least 30 percent by weight of a polyolefin plastomer, a polyolefin elastomer, an ultralow density polyethylene, an ethylene acetate copolymer, an ethylene acrylic acid copolymer, or an ethylene acrylate copolymer, wherein the ultimate elongation of the sealant film is at least 300% in at least one of the machine direction and the cross direction when measured according to ASTM D882, wherein the ultimate tensile strength of the sealant film is less than 50 MPa in at least one of the machine direction and the cross direction when measured according to ASTM D882, and wherein the sealant film has a heat seal initiation temperature of 105° C. or less; wherein the sealant film is laminated to the biaxially oriented polyethylene film by the adhesive.

These and other embodiments are described in more detail in the Detailed Description.

DETAILED DESCRIPTION

Unless specified otherwise herein, percentages are weight percentages (wt %) and temperatures are in ° C.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer. A polymer may be a single polymer, a polymer blend or polymer mixture.

"Polyolefin" means a polymer which comprises greater than 50 wt % units derived from one or more olefinic monomers, for example ethylene or propylene (based on weight of the polymer) and, optionally, may contain at least one comonomer.

"Polyethylene" means a polymer having greater than 50 wt % units derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); single site catalyzed Linear Low Density Polyethylene, including both linear and substantially linear low density resins (m-LLDPE); Medium Density Polyethylene (MDPE); and High Density Polyethylene (HDPE). These polyethylene materials are generally known in the art; however the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.940 g/cm$^3$.

The term "LLDPE", includes both resin made using the traditional Ziegler-Natta catalyst systems as well as single-site catalysts such as metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or U.S. Pat. No. 5,854,045). The LLDPEs can be made via gas-phase, solution-phase or slurry polymerization or any combination thereof, using any type of reactor or reactor configuration known in the art, with gas and slurry phase reactors being most preferred.

The term "MDPE" refers to polyethylenes having densities from 0.926 to 0.940 g/cm$^3$. "MDPE" is typically made using chromium or Ziegler-Natta catalysts or single site catalysts, such as metallocene catalysts and constrained geometry catalysts, and typically have a molecular weight distribution ("MWD") greater than 2.5.

The term "HDPE" refers to polyethylenes having densities greater than about 0.940 g/cm$^3$, which are generally prepared with Ziegler-Natta catalysts, chrome catalysts or single site catalysts, such as metallocene catalysts and constrained geometry catalysts.

The term "ULDPE" refers to polyethylenes having densities of 0.880 to 0.912 g/cm$^3$, which are generally prepared with Ziegler-Natta catalysts, chrome catalysts, or single site catalysts such as metallocene catalysts or constrained geometry catalysts.

"Multilayer structure" means any structure having more than one layer. For example, the multilayer structure may have two, three, four, five or more layers. A multilayer structure may be described as having the layers designated with letters. For example, a three layer structure having a core layer B, and two external layers A and C may be designated as A/B/C. Likewise, a structure having two core layers B and C and two external layers A and D would be designated A/B/C/D.

In one embodiment, a multilayer structure of the present invention comprises (a) a biaxially oriented polyethylene film comprising a linear low density polyethylene having a density of 0.910 to 0.940 g/cm$^3$, wherein the ultimate elongation in the machine direction of the biaxially oriented polyethylene film is at least 2 times greater than the ultimate elongation in the cross direction when measured according to ASTM D882, and wherein the ultimate tensile strength of the biaxially oriented polyethylene film is at least 60 MPa in at least one of the machine direction and the cross direction when measured according to ASTM D882; (b) an adhesive layer; and (c) a sealant film, wherein the ultimate elongation of the sealant film is at least 300% in at least one of the machine direction and the cross direction when measured according to ASTM D882, wherein the ultimate tensile strength of the sealant film is less than 50 MPa in at least one of the machine direction and the cross direction when measured according to ASTM D882, and wherein the sealant film has a heat seal initiation temperature of 105° C. or less; wherein the sealant film is laminated to the biaxially oriented polyethylene film by the adhesive. In a further embodiment, the sealant film comprises at least one layer comprising at least 30 percent by weight of a polyolefin plastomer, a polyolefin elastomer, an ultra low density polyethylene, an ethylene acetate copolymer, an ethylene acrylic acid copolymer, or an ethylene acrylate copolymer.

In another embodiment, a multilayer structure of the present invention comprises (a) a biaxially oriented polyethylene film comprising a linear low density polyethylene having a density of 0.910 to 0.940 g/cm3; (b) an adhesive layer; and (c) a sealant film comprising at least one layer comprising at least 30 percent by weight of a polyolefin plastomer, a polyolefin elastomer, an ultra low density polyethylene, an ethylene acetate copolymer, an ethylene acrylic acid copolymer, or an ethylene acrylate copolymer, wherein the ultimate elongation of the sealant film is at least 300% in at least one of the machine direction and the cross direction when measured according to ASTM D882, wherein the ultimate tensile strength of the sealant film is less than 50 MPa in at least one of the machine direction and the cross direction when measured according to ASTM D882, and wherein the sealant film has a heat seal initiation temperature of 105° C. or less; wherein the sealant film is laminated to the biaxially oriented polyethylene film by the adhesive.

In some embodiments, a first layer of the sealant film comprises at least 50 percent by weight of the polyolefin plastomer, a polyolefin elastomer, an ultra low density polyethylene, an ethylene acetate copolymer, an ethylene acrylic acid copolymer, or an ethylene acrylate copolymer.

In some embodiments, a first layer of the sealant film comprises at least 70 percent by weight of the polyolefin plastomer, a polyolefin elastomer, an ultra low density polyethylene, an ethylene acetate copolymer, an ethylene acrylic acid copolymer, or an ethylene acrylate copolymer.

The sealant film is a monolayer film in some embodiments. The sealant film, in some embodiments, the sealant film comprises a second layer comprising a linear low density polyethylene and a low density polyethylene. The sealant film is a blown film in some embodiments. In some embodiments, the sealant film is a cast film. The sealant film, in some embodiments, has a heat seal initiation temperature of 95° C. or less. In some embodiments, the sealant film has a thickness of 30 to 120 microns.

Regarding the biaxially oriented polyethylene film, the biaxially oriented polyethylene film is a monolayer film in some embodiments. In some embodiments, the biaxially oriented polyethylene film is a multilayer film. The linear low density polyethylene in the biaxially oriented polyethylene film has a density of 0.915 to 0.930 g/cm$^3$ in some embodiments. The biaxially oriented polyethylene film, in some embodiments, further comprises at least one of a high density polyethylene, a low density polyethylene, an ultra low density polyethylene, a polyethylene plastomer, a polyethylene elastomer, an ethylene vinyl acetate, and any polymer comprising at least 50% ethylene monomer. In some embodiments, the biaxially oriented polyethylene film is oriented in the machine direction at a draw ratio from 2:1 to 6:1 and in the cross direction at a draw ratio from 2:1 to 9:1. The biaxially oriented polyethylene film is oriented in the machine direction at a draw ratio from 3:1 to 5:1 and in the cross direction at a draw ratio from 3:1 to 8:1 in some embodiments. In some embodiments, the biaxially oriented polyethylene film has a thickness of 10 to 60 microns.

In some embodiments, the ultimate tensile strength of the biaxially oriented polyethylene film in the machine direction is at least 75 MPa when measured according to ASTM D882. The ultimate tensile strength of the biaxially oriented polyethylene film in the cross direction, in some embodiments, is at least 75 MPa when measured according to ASTM D882. In some embodiments, the biaxially oriented polyethylene film further comprises one or more additives. The one or more additives can include, for example, antioxidants, phosphites, cling additives, anti-static agents, pigments, colorants, fillers, or combinations thereof.

Regarding the adhesive layer, in some embodiments, the adhesive layer is a solventless adhesive, a waterborne adhesive, or a solventborne adhesive.

In some embodiments, the multilayer structure exhibits a sealing window of at least 15° C.

In other aspects, the present invention relates to articles comprising any multilayer structure disclosed herein. In some embodiments, the article is a package. In some embodiments, a package comprising any multilayer structure disclosed herein can further comprise a liquid, a powder, or a food product.

Biaxially Oriented Polyethylene Film

The biaxially oriented polyethylene film used in multilayer structures of the present invention comprises a linear low density polyethylene (LLDPE). Suitable LLDPE's include Ziegler-Natta catalyzed linear low density polyethylene, single site catalyzed (including metallocene) linear low density polyethylene (mLLDPE), and medium density polyethylene (MDPE) so long as the MDPE has a density no greater than 0.940 g/cm$^3$; as well as combinations of two or more of the foregoing. These polyethylene resins are generally known in the art. The LLDPE resins particularly suited for use in the present application can be characterized by the following three parameters.

The LLDPE has a density of 0.910 to 0.940 g/cm$^3$. All individual values and subranges from 0.910 g/cm$^3$ to 0.940 g/cm$^3$ are included herein and disclosed herein; for example, the density of the LLDPE can be from a lower limit of 0.910, 0.912, 0.915, or 0.920 g/cm$^3$ to an upper limit of 0.925, 0.930, 0.935, or 0.940 g/cm$^3$. In some embodiments, the LLDPE has a density from 0.915 to 0.930 g/cm$^3$.

In some embodiments, the LLDPE has a melt index ($I_2$) of up to 10 g/10 minutes. All individual values and subranges up to 10 g/10 minutes are included herein and disclosed herein. For example, the LLDPE can have a melt index to an upper limit of 1.0, 2.0, 3.0, 4.0, 5.0, 6.0, 7.0, 8.0, 9.0, or 10.0 g/10 minutes. In a particular aspect of the invention, the LLDPE has an $I_2$ with a lower limit of 0.5 g/10 minutes.

The biaxially oriented polyethylene film can comprise greater than 50 weight percent LLDPE in some embodiments, greater than 60 weight percent in other embodiments, and greater than 70 weight percent in other embodiments.

In some embodiments, the biaxially oriented polyethylene film can further comprise one or more additional polymers including, for example, a high density polyethylene, a low density polyethylene, an ultra low density polyethylene, a polyethylene plastomer, a polyethylene elastomer, an ethylene vinyl acetate, and any polymer comprising at least 50% ethylene monomer, or a combination thereof. In such embodiments, the one or more additional polymers can be present in an amount less than 50 weight percent.

The biaxially oriented polyethylene film can further comprise one or more additives as known to those of skill in the art such as, for example, antioxidants, phosphites, cling additives, anti-static agents, pigments, colorants, fillers, or combinations thereof.

The biaxially oriented polyethylene film can be a monolayer film or a multilayer film. As to thickness, the biaxially oriented polyethylene film has a thickness (after orientation) from 10 to 60 microns. All individual values and subranges from 10 to 60 microns are included and disclosed herein; for example the thickness of the biaxially oriented polyethylene film can range from a lower limit of 10, 20, 30, 40, or 50 microns to an upper limit of 25, 35, 45, 55, or 60 microns. For example, the thickness of the biaxially oriented polyethylene film can range from 10 to 60 microns, or in the alternative, from 20 to 50 microns, or in the alternative from 25 to 40 microns.

In some embodiments, the polyethylene film is biaxially oriented using a tenter frame sequential biaxial orientation process. Such techniques are generally known to those of skill in the art. In other embodiments, the polyethylene film can be biaxially oriented using other techniques known to those of skill in the art based on the teachings herein, such as double bubble orientation processes. In general, with a tenter frame sequential biaxial orientation process, the tenter frame is incorporated as part of a multilayer co-extrusion line. After extruding from a flat die, the film is cooled down on a chill roll, and is immersed into a water bath filled with room temperature water. The cast film is then passed onto a series of rollers with different revolving speeds to achieve stretching in the machine direction. There are several pairs of rollers in the MD stretching segment of the fabrication line, and are all oil heated. The paired rollers work sequentially as pre-heated rollers, stretching rollers, and rollers for relaxing and annealing. The temperature of each pair of rollers is separately controlled. After stretching in the machine direction, the film web is passed into a tenterframe hot air oven with heating zones to carry out stretching in the cross direction. The first several zones are for pre-heating, followed by zones for stretching, and then the last zones for annealing.

In some embodiments, the polyethylene film can be oriented in the machine direction at a draw ratio of 2:1 to 6:1, or in the alternative, at a draw ratio of 3:1 to 5:1. The polyethylene film, in some embodiments, can be oriented in the cross direction at a draw ratio of 2:1 to 9:1, or in the alternative, at a draw ratio of 3:1 to 8:1. In some embodiments, the polyethylene film is oriented in the machine direction at a draw ratio of 2:1 to 6:1 and in the cross direction at a draw ratio of 2:1 to 9:1.

Following biaxial orientation, the biaxially oriented polyethylene film can exhibit a number of physical properties. For example, in some embodiments, the biaxially oriented polyethylene film can exhibit an ultimate elongation in the machine direction that is at least 2 times greater than the ultimate elongation in the cross direction when measured according to ASTM D882, or in the alternative, at least 5 times greater, or in the alternative, at least 8 times greater, or in the alternative, at least 10 times greater. The biaxially oriented polyethylene film, in some embodiments, can exhibit an ultimate tensile strength of at least 60 MPa in at least one of the machine direction and the cross direction when measured according to ASTM D882. In some embodiments, the biaxially oriented polyethylene film exhibits an ultimate tensile strength of at least 75 MP in the machine direction and/or at least 75 MP in the cross direction when measured according to ASTM D882.

In some embodiments, depending for example on the end use application, the biaxially oriented polyethylene film can be corona treated or printed using techniques known to those of skill in the art before or after lamination to the sealant film.

Sealant Film

The sealant film used in multilayer structures of the present invention is initially formed separately from the biaxially oriented polyethylene film. Accordingly, the sealant film is not biaxially oriented, but is laminated to the biaxially oriented polyethylene film.

The sealant film, in some embodiments, exhibits an ultimate tensile strength of less than 50 MPa in at least one of the machine direction and the cross direction when measured according to ASTM D882. In some embodiments, the sealant film exhibits an ultimate tensile strength of less than 40 MPa in at least one of the machine direction and the cross direction when measured according to ASTM D882. The sealant film, in some embodiments, exhibits an ultimate tensile strength of less than 30 MPa in at least one of the machine direction and the cross direction when measured according to ASTM D882.

The sealant film, in some embodiments, exhibits an ultimate elongation of at least 300% in at least one of the machine direction and the cross direction when measured according to ASTM D882. In some embodiments, the sealant film exhibits an ultimate elongation of at least 500% in at least one of the machine direction and the cross direction when measured according to ASTM D882. The sealant film, in some embodiments, exhibits an ultimate elongation of at least 700% in at least one of the machine direction and the cross direction when measured according to ASTM D882.

In some embodiments, the sealant film exhibits any combination of the ultimate tensile strengths and ultimate elongations recited above.

The sealant film, in some embodiments, exhibits a heat seal initiation temperature of 105° C. or less. In some embodiments, the sealant film exhibits a heat seal initiation temperature of 95° C. or less. The method for determining heat seal initiation temperature is described in the Test Methods section below.

The sealant film can be a monolayer film or a multilayer film. The sealant film can be a blown film or a cast film. As set forth herein, the sealant film is not coextruded with the biaxially oriented polyethylene film, but is laminated to the biaxially oriented polyethylene film according to the present invention.

In some embodiments, a first layer of the sealant film comprises at least 30 percent by weight of a polyolefin plastomer, a polyolefin elastomer, an ultra low density polyethylene, an ethylene acetate copolymer, an ethylene acrylic acid copolymer, or an ethylene acrylate copolymer.

In the embodiment where the sealant film is a monolayer film, a first layer of the sealant film is the only layer. A first layer of the sealant film, in some embodiments, comprises at least 50 percent by weight of a polyolefin plastomer, a polyolefin elastomer, an ultra low density polyethylene, an ethylene acetate copolymer, an ethylene acrylic acid copolymer, or an ethylene acrylate copolymer. In some embodiments, a first layer of the sealant film comprises at least 70 percent by weight of a polyolefin plastomer, a polyolefin elastomer, an ultra low density polyethylene, an ethylene acetate copolymer, an ethylene acrylic acid copolymer, or an ethylene acrylate copolymer. A first layer of the sealant film, in some embodiments, comprises 100 percent by weight of a polyolefin plastomer, a polyolefin elastomer, an ultra low density polyethylene, an ethylene acetate copolymer, an ethylene acrylic acid copolymer, or an ethylene acrylate copolymer.

In embodiments where the first layer of the sealant film comprises less than 100 percent by weight of a polyolefin plastomer, a polyolefin elastomer, an ultra low density polyethylene, an ethylene acetate copolymer, an ethylene acrylic acid copolymer, or an ethylene acrylate copolymer, the first layer may further comprise one of the other components listed, a low density polyethylene, or a linear low density polyethylene.

In some embodiments, the first layer of the sealant film comprises (a) a polyolefin plastomer, a polyolefin elastomer, an ultra low density polyethylene, an ethylene acetate copolymer, an ethylene acrylic acid copolymer, or an ethylene acrylate copolymer, and (b) a low density polyethylene. In some embodiments, the first layer comprises at least 30% of component (a) and 70% or less of low density polyethylene. The first layer of the sealant film, in some embodiments, comprises at least 50% of component (a) and 50% or less of low density polyethylene. In some embodiments, the first layer of the sealant film comprises at least 70% of component (a) and 30% or less of low density polyethylene. In some embodiments, component (a) of the first layer of the sealant film is a polyolefin plastomer.

When the sealant film comprises a polyolefin plastomer, the polyolefin plastomer can be a polyethylene plastomer or a polypropylene plastomer. Polyolefin plastomers include resins made using single-site catalysts such as metallocenes and constrained geometry catalysts. The polyolefin plastomer has a density of 0.885 to 0.915 g/cm$^3$. All individual values and subranges from 0.885 g/cm$^3$ to 0.915 g/cm$^3$ are included herein and disclosed herein; for example, the density of the polyolefin plastomer can be from a lower limit of 0.895, 0.900, or 0.905 g/cm$^3$ to an upper limit of 0.905, 0.910, or 0.915 g/cm$^3$. In some embodiments, the polyolefin plastomer has a density from 0.890 to 0.910 g/cm$^3$.

In some embodiments, the polyolefin plastomer has a melt index ($I_2$) of up to 20 g/10 minutes. All individual values and subranges up to 20 g/10 minutes are included herein and disclosed herein. For example, the polyolefin plastomer can have a melt index to an upper limit of 1.0, 2.0, 3.0, 4.0, 5.0, 6.0, 7.0, 8.0, 9.0, 10.0, 11, 12, 13, 14, 15, 16, 17, 18, 19, or 20 g/10 minutes. In a particular aspect of the invention, the polyolefin plastomer has an $I_2$ with a lower limit of 0.5 g/10 minutes. One factor in identifying a melt index for the polyolefin plastomer is whether the sealant film will be manufactured as a blown film or a cast film.

Examples of polyolefin plastomers that can be used in the sealant film include those commercially available from The Dow Chemical Company under the name AFFINITY™ including, for example, AFFINITY™ PL 1881G and AFFINITY™ PF1140G.

When the sealant film comprises a polyolefin elastomer, the polyolefin elastomer can be a polyethylene elastomer or a polypropylene elastomer. The polyolefin elastomer has a density of 0.857 to 0.885 g/cm$^3$. All individual values and subranges from 0.857 g/cm$^3$ to 0.885 g/cm$^3$ are included herein and disclosed herein; for example, the density of the polyolefin elastomer can be from a lower limit of 0.857, 0.860, 0.865, 0.870, or 0.875 g/cm$^3$ to an upper limit of 0.870, 0.875, 0.880, or 0.885 g/cm$^3$. In some embodiments, the polyolefin elastomer has a density from 0.860 to 0.880 g/cm$^3$.

In some embodiments, the polyolefin elastomer has a melt index ($I_2$) of up to 20 g/10 minutes. All individual values and subranges up to 20 g/10 minutes are included herein and disclosed herein. For example, the polyolefin elastomer can have a melt index to an upper limit of 1.0, 2.0, 3.0, 4.0, 5.0, 6.0, 7.0, 8.0, 9.0, 10.0, 11, 12, 13, 14, 15, 16, 17, 18, 19, or 20 g/10 minutes. In a particular aspect of the invention, the polyolefin elastomer has an $I_2$ with a lower limit of 0.5 g/10 minutes. One factor in identifying a melt index for the polyolefin elastomer is whether the sealant film will be manufactured as a blown film or a cast film.

Examples of polyolefin elastomers that can be used in the sealant film include those commercially available from The Dow Chemical Company under the name AFFINITY™ including, for example, AFFINITY™ EG8100G and AFFINITY™ EG8200G.

When the sealant film comprises an ultra low density polyethylene (ULDPE), the ULDPE has a density of 0.880 to 0.915 g/cm³. All individual values and subranges from 0.880 g/cm³ to 0.915 g/cm³ are included herein and disclosed herein; for example, the density of the ULDPE can be from a lower limit of 0.880, 0.885, 0.890, 0.895, 0.900, or 0.905 g/cm³ to an upper limit of 0.895, 0.900, 0.905, 0.910, 0.912, or 0.915 g/cm³. In some embodiments, the ULDPE has a density from 0.885 to 0.910 g/cm³.

In some embodiments, the ULDPE has a melt index ($I_2$) of up to 20 g/10 minutes. All individual values and subranges up to 20 g/10 minutes are included herein and disclosed herein. For example, the ULDPE can have a melt index to an upper limit of 1.0, 2.0, 3.0, 4.0, 5.0, 6.0, 7.0, 8.0, 9.0, 10.0, 11, 12, 13, 14, 15, 16, 17, 18, 19, or 20 g/10 minutes. In a particular aspect of the invention, the ULDPE has an $I_2$ with a lower limit of 0.5 g/10 minutes.

Examples of ULDPE that can be used in the sealant film include those commercially available from The Dow Chemical Company under the name ATTANE™ including, for example, ATTANE™ 4201G and ATTANE™ 4203.

When the sealant film comprises an ethylene acetate copolymer, the ethylene acetate copolymer can be, for example, ethylene vinyl acetate. In some embodiments, the ethylene acetate copolymer can have an acetate content of 5% to 40%. The ethylene acetate copolymer has a density of 0.920 to 0.970/cm³. All individual values and subranges from 0.920 g/cm³ to 0.970 g/cm³ are included herein and disclosed herein; for example, the density of the ethylene acetate copolymer can be from a lower limit of 0.920, 0.925, 0.930, 0.935, 0.940 g/cm³ to an upper limit of, 0.945, 0.950, 0.955, 0.960, 0.965 or 0.970 g/cm³. In some embodiments, the ethylene acetate copolymer has a density from 0.930 to 0.950 g/cm³.

In some embodiments, the ethylene acetate copolymer has a melt index ($I_2$) of up to 20 g/10 minutes. All individual values and subranges up to 20 g/10 minutes are included herein and disclosed herein. For example, the ethylene acetate copolymer can have a melt index to an upper limit of 1.0, 2.0, 3.0, 4.0, 5.0, 6.0, 7.0, 8.0, 9.0, 10.0, 11, 12, 13, 14, 15, 16, 17, 18, 19, or 20 g/10 minutes. In a particular aspect of the invention, the ethylene acetate copolymer has an $I_2$ with a lower limit of 0.25 g/10 minutes.

Examples of ethylene acetate copolymer that can be used in the sealant film include those commercially available from Dupont-Mitsui Polychemical Co., Ltd. under the name Evaflex™ including, for example, Evaflex™ 410 and Evaflex™ 460.

When the sealant film comprises an ethylene acrylic acid copolymer, the ethylene acrylic acid copolymer has a density of 0.920 to 0.960 g/cm³. All individual values and subranges from 0.920 g/cm³ to 0.960 g/cm³ are included herein and disclosed herein; for example, the density of the ethylene acrylic acid copolymer can be from a lower limit of 0.920, 0.925, or 0.930 g/cm³ to an upper limit of 0.935, 0.940, 0.945, 0.950, 0.955, or 0.960 g/cm³. In some embodiments, the ethylene acrylic acid copolymer has a density from 0.930 to 0.938 g/cm³.

In some embodiments, the ethylene acrylic acid copolymer has a melt index ($I_2$) of up to 20 g/10 minutes. All individual values and subranges up to 20 g/10 minutes are included herein and disclosed herein. For example, the ethylene acrylic acid copolymer can have a melt index to an upper limit of 1.0, 2.0, 3.0, 4.0, 5.0, 6.0, 7.0, 8.0, 9.0, 10.0, 11, 12, 13, 14, 15, 16, 17, 18, 19, or 20 g/10 minutes. In a particular aspect of the invention, the ethylene acrylic acid copolymer has an $I_2$ with a lower limit of 0.25 g/10 minutes.

In some embodiments comprising an ethylene acrylic acid copolymer, the ethylene acrylic acid copolymer can have an acrylic acid content of 3% to 20%.

Examples of ethylene acrylic acid copolymer that can be used in the sealant film include those commercially available from The Dow Chemical Company under the name PRIMACOR™ including, for example, PRIMACOR™ 3003 and PRIMACOR™ 3004.

When the sealant film comprises an ethylene acrylate copolymer, the ethylene acrylate copolymer can be, for example, ethylene ethyl acrylate. The ethylene acrylate copolymer has a density of 0.920 to 0.955 g/cm³. All individual values and subranges from 0.920 g/cm³ to 0.950 g/cm³ are included herein and disclosed herein; for example, the density of the ethylene acrylate copolymer can be from a lower limit of 0.920, 0.925, 0.930, 0.935, or 0.940 g/cm³ to an upper limit of 0.930, 0.935, 0.940, 0.945, 0.950, or 0.955 g/cm³. In some embodiments, the ethylene acrylate copolymer has a density from 0.930 to 0.940 g/cm³.

In some embodiments comprising an ethylene acrylate copolymer, the ethylene acrylate copolymer can have an acrylate content of 10% to 25%.

In some embodiments, the ethylene acrylate copolymer has a melt index ($I_2$) of up to 20 g/10 minutes. All individual values and subranges up to 20 g/10 minutes are included herein and disclosed herein. For example, the ethylene acrylate copolymer can have a melt index to an upper limit of 1.0, 2.0, 3.0, 4.0, 5.0, 6.0, 7.0, 8.0, 9.0, 10.0, 11, 12, 13, 14, 15, 16, 17, 18, 19, or 20 g/10 minutes. In a particular aspect of the invention, the ethylene acrylate copolymer has an $I_2$ with a lower limit of 0.25 g/10 minutes.

Examples of ethylene acrylate copolymer that can be used in the sealant film include those commercially available from The Dow Chemical Company under the name AMPLIFY™ EA including, for example, AMPLIFY™ EA 101 and AMPLIFY™ EA 100.

The low density polyethylene (LDPE) that can be used in the first layer of some embodiments of the sealant film has a density of 0.916 to 0.940 g/cm³. All individual values and subranges from 0.916 g/cm³ to 0.940 g/cm³ are included herein and disclosed herein; for example, the density of the LDPE can be from a lower limit of 0.916, 0.920, 0.924, 0.928 or 0.930 g/cm³ to an upper limit of 0.925, 0.930, 0.935, or 0.940 g/cm³. In some embodiments, the LDPE has a density from 0.916 to 0.930 g/cm³.

In some embodiments, the LDPE has a melt index ($I_2$) of up to 20 g/10 minutes. All individual values and subranges up to 20 g/10 minutes are included herein and disclosed herein. For example, the LDPE can have a melt index to an upper limit of 1.0, 2.0, 3.0, 4.0, 5.0, 6.0, 7.0, 8.0, 9.0, 10.0, 11, 12, 13, 14, 15, 16, 17, 18, 19, or 20 g/10 minutes. In a particular aspect of the invention, the LDPE has an $I_2$ with a lower limit of 0.25 g/10 minutes.

In some embodiments where the sealant film is a multilayer film, the sealant film can comprise a second layer comprising a linear low density polyethylene and a low density polyethylene. In such embodiments, the second layer can comprise up to 100 weight percent LLDPE and up to 100 weight percent LDPE, preferably 10 to 90 weight percent LLDPE and 10 to 90 weight percent LDPE based on the weight of the second layer.

Suitable LLDPE's for the second layer of the sealant film can include any of those disclosed in connection with the biaxially oriented polyethylene film. Suitable LDPE's for the second layer of the sealant film can include any of those disclosed above in connection with the first layer of the sealant film.

When the sealant film is a multilayer film, some embodiments comprise three or more additional layers. For example, the additional layers, in some embodiments, comprise any number of additional polymers depending, for example, on the intended use of the film or desired properties and can include, for example, polyethylene, polypropylene, polyester, polyamide or ethylenevinyl alcohol copolymer.

As to thickness, the sealant film has a thickness (after orientation) from 30 to 120 microns. All individual values and subranges from 30 to 120 microns are included and disclosed herein; for example the thickness of the sealant film can range from a lower limit of 30, 40, 50, 60, 70, 80, or 90 microns to an upper limit of 50, 60, 70, 80, 90, 100, 110, or 120 microns. For example, the thickness of the sealant film can range from 30 to 120 microns, or in the alternative, from 60 to 90 microns, or in the alternative from 30 to 50 microns.

In some embodiments, depending for example on the end use application, the sealant film can be corona treated or printed using techniques known to those of skill in the art before or after lamination to the biaxially oriented polyethylene film.

Adhesive Layer

In embodiments of the present invention, the sealant film is laminated to the biaxially oriented polyethylene film with an adhesive layer. To be clear, the adhesive layer is not a tie layer that might be included between a polyethylene film and a sealant film during coextrusion. Rather, as set forth above, the biaxially oriented polyethylene film and the sealant film are formed separately and then laminated with the adhesive layer.

In general, the adhesive layer can comprise any adhesive suitable for laminating sealant films to polyethylene films. The adhesive layer can comprise a solventless adhesive, a waterborne adhesive, or a solventborne adhesive. The biaxially oriented polyethylene film and the sealant film can be laminated using a dry or wet or solventless lamination process using techniques known to those of skill in the art based on the teachings herein.

The weight or thickness of the adhesive layer can depend on a number of factors including, for example, the thickness of the biaxially oriented polyethylene film, the thickness of the sealant film, the desired thickness of the multilayer structure, the type of adhesive used, and other factors. In some embodiments, the adhesive layer is applied at up to 5.0 grams/m$^2$, or from 1.0 to 4.0 g/m$^2$, or from 2.0 to 3.0 g/m$^2$.

Examples of adhesives that can be used as adhesive layers in accordance with embodiments of the present invention include those commercially available from The Dow Chemical Company as MOR-FREE™ adhesives, such as MOR-FREE™ 698A blended with MOR-FREE™ C79, or MOR-FREE™ 421 blended with MOR-FREE™ C83.

In some embodiments, multilayer structures of the present invention can comprise other layers in addition to a biaxially oriented polyethylene film, a sealant layer, and an adhesive layer. For example, multilayer structures of the present invention, in some embodiments, can comprise one or more additional biaxially oriented polyethylene films, one or more additional sealant films, and/or one or more additional adhesive layers. Multilayer structures of the present invention, in some embodiments, can further comprise other layers including, for example, a biaxially oriented polyamide film, a biaxially oriented polyethylene terephthalate film, a biaxially oriented polypropylene film, an ethylene vinyl alcohol film, a polyvinylidene chloride film, a metallized biaxially oriented polyamide film, a metallized biaxially oriented polyethylene terephthalate film, a metallized biaxially oriented polypropylene film, and/or other films, and combinations thereof. In some embodiments, multilayer structures of the present invention further comprise at least one of a second biaxially oriented polyethylene film, a second adhesive layer, a polyolefin-based film made by a blown, cast, or water-quench process, a biaxially oriented polyamide film, a biaxially oriented polypropylene film, a biaxially oriented glycol-modified polyethylene terephthalate, a polyvinylidene chloride film, and a foil.

The lamination of the biaxially oriented polyethylene film to the sealant film provides a multilayer structure having a number of beneficial properties. In some embodiments, multilayer structures of the present invention advantageously exhibit good heat seal properties in combination with good physical properties while minimizing potential issues such as wrinkling during heat sealing of the structure. For example, the biaxially oriented polyethylene film can provide toughness and printability while the sealant film can provide a broad wrinkle-free (or substantially wrinkle-free) sealing window.

In some embodiments, the multilayer structure can exhibit a tensile strength of at least 50 MPa in at least one of the machine direction and the cross direction when measured according to ASTM D882. The multilayer structure, in some embodiments, can exhibit an elongation of at least 150% in at least one of the machine direction and the cross direction, and in some embodiments, at least 200% in at least one of the machine direction and the cross direction when measured according to ASTM D882.

In some embodiments, the multilayer structure can exhibit a heat sealing window of at least 15° C. The multilayer structure, in some embodiments can exhibit a heat sealing window of at least 20° C. In some embodiments, the multilayer structure can exhibit a heat sealing window of up to 25° C. The multilayer structure can exhibit a heat sealing window of 15 to 25° C. The heat sealing window can be determined as described in the Test Methods section below.

Embodiments of the present invention also provide articles formed from any of the multilayer structures described herein. Examples of such articles can include packages, flexible packages, pouches, labels. In some embodiments, packages of the present invention can comprise a liquid, a powder, a food product, or other items. Articles and packages of the present invention can be formed from multilayer structures disclosed herein using techniques known to those of skill in the art in view of the teachings herein.

Some embodiments of the invention will now be described in detail in the following Examples.

EXAMPLES

Example 1

Sealant Film

Four three-layer sealant films are fabricated through a conventional polyethylene blown film process. Table 1 provides the structures of the sealant films:

TABLE 1

Sealant Films

|  | Layer 1 | Layer 2 | Layer 3 |
|---|---|---|---|
| Comparative Sealant Film | 50% LLDPE-1 50% LDPE | 50% LLDPE-1 50% LDPE | 100% LLDPE-2 |
| Sealant Film 1 | 50% LLDPE-1 50% LDPE | 50% LLDPE-1 50% LDPE | 33% POP 67% LDPE |
| Sealant Film 2 | 50% LLDPE-1 50% LDPE | 50% LLDPE-1 50% LDPE | 50% POP 50% LDPE |
| Sealant Film 3 | 50% LLDPE-1 50% LDPE | 50% LLDPE-1 50% LDPE | 80% POP 20% LDPE |

Layer 1, Layer 2, and Layer 3 each have a nominal layer thickness of 12 microns to provide a nominal sealant film thickness of 36 microns. LLDPE-1 is a linear low density polyethylene resin commercially available from Shanghai SECCO Petrochemical Company as item SECCO LL0220KJ, and has a melt index ($I_2$) of 2.0 g/10 minutes and a density of 0.921 g/cm$^3$. LDPE is a low density polyethylene resin commercially available from the Qatar Petrochemical Company as item Lotrene FD0274, and has a melt index ($I_2$) of 2.4 g/10 minutes and a density of 0.923 g/cm$^3$. LLDPE-2 is a linear low density polyethylene resin commercially available from the Dow Chemical Company as DOWLEX™ 2045.11G, and has a melt index ($I_2$) of 1.0 g/10 minutes and a density of 0.922 g/cm$^3$. POP is a polyolefin plastomer resin commercially available from the Dow Chemical Company as AFFINITY™ PL 1881G, and has a melt index ($I_2$) of 1.0 g/10 minutes and a density of 0.904 g/cm$^3$.

The heat seal strengths of the four sealant films are measured in accordance with the method set out in the Test Methods section below. The results are provided in Table 2:

TABLE 2

Heat Seal Strengths

| | Seal Temp. | | | | | | | | | | | | | | |
|---|---|---|---|---|---|---|---|---|---|---|---|---|---|---|---|
| | 80° C. | 85° C. | 90° C. | 95° C. | 100° C. | 105° C. | 110° C. | 115° C. | 120° C. | 125° C. | 130° C. | 135° C. | 140° C. | 150° C. | 160° C. |
| Comp. Sealant Film | — | — | 0.1 | 0.1 | 0.2 | 0.8 | 10.3 | 20.1 | 21.4 | 22.4 | 23.5 | 23.3 | 24.6 | 23.8 | 23.5 |
| Sealant Film 1 | — | — | 1.8 | 4.1 | 11.6 | 21.5 | 23.2 | 23.9 | 22.1 | 22.4 | 22.3 | 24.6 | 24.2 | 27.6 | 28.1 |
| Sealant Film 2 | 0.1 | 0.3 | 4.1 | 9.1 | 18.1 | 25.8 | 26.6 | 27.3 | 26.1 | 25.7 | 26.5 | 26.1 | 25.5 | 24.2 | 24.4 |
| Sealant Film 3 | 1.0 | 3.5 | 8.8 | 16.0 | 22.5 | 22.8 | 23.0 | 23.4 | 23.3 | 22.9 | 22.8 | 23.0 | 23.6 | 23.2 | 23.6 |

As set forth herein, the heat seal initiation temperature is the temperature at which the film exhibits a seal strength of greater than 10 N/inch. As shown in Table, the heat seal initiation temperature was ~110° C. for the Comparative Sealant Film, ~98° C. for Sealant Film 1, ~96° C. for Sealant Film 2, and ~91° C. for Sealant Film 3.

Certain physical properties of the sealant films are also measured in accordance with ASTM D882 and reported in Table 3:

TABLE 3

Physical Properties of Sealant Films

| | Ultimate Elongation (%) | | Ultimate Tensile Strength (MPa) | |
|---|---|---|---|---|
| Sealant Films | MD | CD | MD | CD |
| Comparative Sealant Film | 203.39 | 854.77 | 24.54 | 22.83 |
| Sealant Film 1 | 124.75 | 924.56 | 29.73 | 19.67 |
| Sealant Film 2 | 179.6 | 907.85 | 29.37 | 22.32 |
| Sealant Film 3 | 218.4 | 863.39 | 27.08 | 24.41 |

The ultimate elongations in the cross direction (CD) are greater than 800%, and the ultimate tensile strengths in the machine direction (MD) and the CD are less than 30.0 MPa.

Biaxially Oriented Polyethylene Film (BOPE)

A biaxially oriented polyethylene film is also prepared. The polyethylene compound used for the film is prepared as follows. A first polyethylene is prepared in a dual polymerization reactor system. Table 4 provides the reactor conditions for the dual reactor polyethylene composition (PE Comp.). The properties of Reactor 2 product are calculated based on the measured properties of the Reactor 1 Product and the final product according to:

$$1/\rho_f = w_1/\rho_1 + w_2/\rho_2$$

$$MI_f^{-0.277} = w_1 MI_1^{-0.277} + w_2 MI_2^{-0.277}$$

where $\rho$ is density, w is weight fraction, MI is melt index ($I_2$), subscript 1 denotes the reactor 1, subscript 2 denotes the reactor 2 and subscript f denotes the final product.

TABLE 4

Reactor Conditions

| | Reactor 1 catalyst | Reactor 1 Product density (g/cc) | Reactor 1 Product $I_2$ (g/10 min) | Reactor 2 catalyst | Reactor 2 Product density (g/cc)* | Reactor 2 Product $I_2$ (g/10 min) | Reactor 1/Reactor 2 split, % | Final product density (g/cc) | Final Prod. $I_2$ (g/10 min) |
|---|---|---|---|---|---|---|---|---|---|
| PE Comp. | Molecular | 0.905 | 15 | ZN | 0.939 | 0.65 | 35/65 | 0.927 | 1.5 |

*calculated as described below

Table 5 provides additional properties of this polyethylene composition:

TABLE 5

| | Additional Properties | |
|---|---|---|
| | $MW_{HDF>95}$ (kg/mol) | $I_{HDF>95}$ (kg/mol) |
| PE Comp. | 149 | 68.1 |

The PE composition is blended with a low density polyethylene (DOW™ 6211 from The Dow Chemical Company) as described in Table 6:

TABLE 6

| | Composition (in weight %) | $MW_{HDF>95}$ (kg/mol) | $I_{HDF>95}$ (kg/mol) |
|---|---|---|---|
| PE Compound for Film | 90% PE Comp. 7 + 10% LDPE 621I | 150 | 61.9 |

A three-layer film is fabricated on a tailor-made tenter frame bi-orientation line with the same polyethylene compound (the PE Compound described above) in all three layers. The tenter-frame line has a 3-layer co-extrusion line. The output ratio of the three extruders is 1:6:1. After extruding from a flat die, the film is cooled down on a chill roll, and is immersed into a water bath filled with room temperature water. This cast film is then passed onto a series of rollers with different revolving speeds to achieve machine direction (MD) stretching. There are 3 pairs of rollers in the MD stretching segment of the fabrication line, which are all oil heated. The first pair of rollers is pre-heated. The second pair is stretching rollers. The last pair of rollers is for relaxing and annealing. The temperature of each pair of rollers is controlled separately. After MD stretching, the film web is passed into a tenter-frame hot air oven containing 7 heating zones to carry out the cross direction (CD) stretching. The first 3 zones are for pre-heating and the following 2 zones are for stretching. The last 2 zones are for annealing. The temperature of each zone is controlled separately. All temperatures of each roller for MD stretching and each heating zone for CD stretching are listed in the columns "MD Stretch Temp." and "CD Stretch Temp." of Table 3. The CD orientation ratio of this tailor made tenter frame line is fixed at 8 times. The MD stretch ratio is maintained at 4 times. Detailed processing information is listed in Table 7.

TABLE 7

Detailed Process Information for Film Made on Tenter Frame Line

| Stretch Layer Ratio | Ratio (MD/CD) | MD Stretch Temp. (° C.) | | | CD Stretch Temp. (° C.) | | |
|---|---|---|---|---|---|---|---|
| | | Pre-heat | Stretch | Anneal | Pre-heat | Stretch | Anneal |
| 1:6:1 | 4/8 | 117 | 97 | 100 | 133-130-130 | 115-115 | 130-119 |

The biaxially oriented polyethylene film has a thickness of 38 microns. Certain physical properties of this film are measured in accordance with ASTM D882 and reported in Table 8:

TABLE 8

| Physical Properties of BOPE | |
|---|---|
| Ultimate Tensile Strength, Machine Direction | 90 MPa |
| Ultimate Elongation, Machine Direction | 291% |
| Ultimate Tensile Strength, Cross Direction | 109 MPa |
| Ultimate Elongation, Cross Direction | 26% |

The ultimate elongation of the biaxially oriented polyethylene film is ~11 times greater in the machine direction as compared to the cross direction, and the tensile strength of the film is greater than 75 MPa in both directions.

Multilayer Structures

Each of the sealant films from Table 1 are laminated to the biaxially oriented polyethylene film (BOPE) described above with an adhesive to the form multilayer structures in Table 9:

TABLE 9

| | Multilayer Structures |
|---|---|
| Comparative Structure | BOPE/Adhesive/Comparative Sealant Film |
| Inventive Structure 1 | BOPE/Adhesive/Sealant Film 1 |
| Inventive Structure 2 | BOPE/Adhesive/Sealant Film 2 |
| Inventive Structure 3 | BOPE/Adhesive/Sealant Film 3 |

The adhesive layer used is MOR-FREE™ 698A blended with MOR-FREE™ C79 (each of which are commercially available from The Dow Chemical Company) at a weight ratio of 100:50. The adhesive layer is applied at a weight of 1.9 g/m².

The heat seal strengths of the four multilayer structures are measured in accordance with the method set out in the Test Methods section below. In addition, the shrinkage ratio and wrinkle level of the four multilayer structures are also measured in accordance with the method set out in the Test Methods section below. The results are provided in Table 10:

| | | Seal Temperature | | | | | | | | | |
|---|---|---|---|---|---|---|---|---|---|---|---|
| | | 80° C. | 85° C. | 90° C. | 95° C. | 100° C. | 105° C. | 110° C. | 115° C. | 120° C. | 125° C. | 130° C. |
| Comp. Struct. | Seal strength | — | — | 0.1 | 0.2 | 0.5 | 1.2 | 10.2 | 48.1 | 63.8 | 72.4 | 65.6 |
| | Shrinkage | 0.0% | 0.0% | 0.0% | 0.0% | 0.0% | 0.0% | 0.0% | 1.4% | 5.5% | 15.2% | 19.9% |
| | Wrinkle | No | No | No | No | No | No | No | Minor | Minor | Severe | Severe |
| Inv. Struct. 1 | Seal strength | 0.0 | 0.0 | 0.4 | 2.7 | 11.5 | 36.0 | 49.1 | 55.6 | 58.7 | 61.5 | 63.0 |
| | Shrinkage | 0.0% | 0.0% | 0.0% | 0.0% | 0.0% | 0.0% | 0.0% | 1.4% | 5.5% | 17.1% | 24.3% |
| | Wrinkle | No | No | No | No | No | No | No | Minor | Minor | Severe | Severe |
| Inv. Struct. 2 | Seal strength | 0.2 | 1.0 | 4.2 | 13.5 | 30.3 | 59.3 | 66.0 | 67.9 | 62.2 | 67.7 | 63.7 |
| | Shrinkage | 0.0% | 0.0% | 0.0% | 0.0% | 0.0% | 0.7% | 1.6% | 5.6% | 15.2% | 24.7% | |
| | Wrinkle | No | No | No | No | No | No | No | Minor | Minor | Severe | Severe |

| | | Seal Temperature | | | | | | | | | | |
|---|---|---|---|---|---|---|---|---|---|---|---|---|
| | | 80° C. | 85° C. | 90° C. | 95° C. | 100° C. | 105° C. | 110° C. | 115° C. | 120° C. | 125° C. | 130° C. |
| Inv. Struct. 3 | Seal strength | 2.3 | 7.5 | 16.8 | 36.9 | 69.5 | 70.3 | 71.1 | 73.2 | 71.8 | 71.7 | 65.7 |
| | Shrinkage | 0.0% | 0.0% | 0.0% | 0.0% | 0.0% | 0.0% | 1.4% | 3.0% | 5.2% | 16.4% | 23.9% |
| | Wrinkle | No | No | No | No | No | No | No | Minor | Minor | Severe | Severe |

In general, it is desirable for a multilayer structure to be used in a package or other article to have high heat seal strength and a good visible appearance. Heat seal strengths of 40 N/inch or more are desired to ensure package integrity. At the same time, wrinkling at the sealed area should be minimized. With that in mind, one measure of a proper sealing window is the sealing temperature range at which the heat seal strength is 40 N/inch or more and the seal exhibits no or minor wrinkles. Under that analysis, the sealing window was ~10° C. for the Comparative Structure, ~15° C. for Inventive Structure 1, ~20° C. for Inventive Structure 2, and ~25° C. for Inventive Structure 3.

Test Methods

Test methods include the following:
Polymer crystallinity can be measured by differential scanning calorimetry, and other analytical methods. For ethylene homopolymer or ethylene alpha-olefin copolymers, and the examples herein, crystallinity can be calculated from its density by the following equation:

$$Cryst. = -\frac{1}{Den.}\left(\frac{Den.-0.855}{0.145}\right)$$

Figure 1:
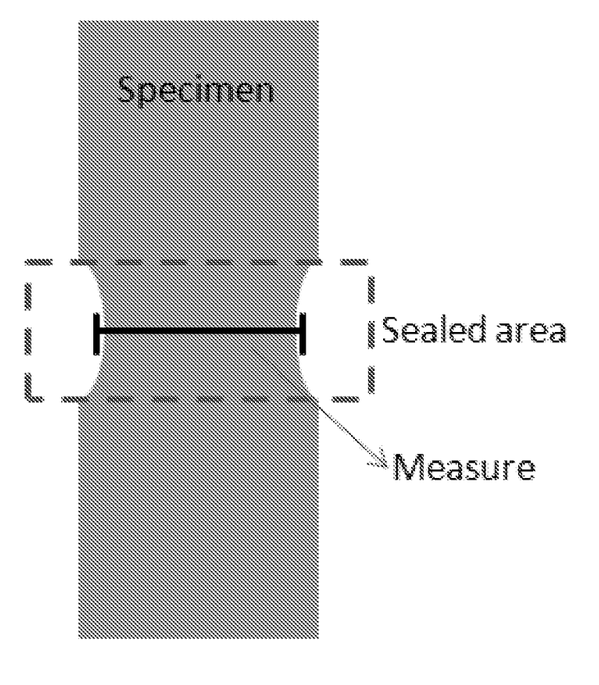
FIG. 1 illustrates a measurement taken to determine shrinkage ratio and wrinkle level as set forth in the Examples.

Polymer density is measured according to ASTM D792.
Melt index ($I_2$) is measured in accordance with ASTM D-1238 at 190° C. and 2.16 kg.
Heat Seal Strength
The hot tack tester (Model 4000, J&B Corp.) is used in "seal only" mode without pulling. To conduct heat seal strength measurements, seal parameters are as follows: width of sample strip=1 inch; seal time=0.5 s; seal pressure=0.275 MPa. Then, sealed sample strips are aged 24 hours, under controlled environment (23±2° C., 55±5 relative humidity). Thereafter, seal strength is tested on a tensile machine (Type5943, INSTRON Corp.) with pulling speed of 500 mm/min. Max load is recorded as seal strength. Each data point is the averaged results of five parallel sample strips. The heat seal initiation temperature is the minimum temperature at which the film exhibits a heat seal strength of 10 N/inch.
Wrinkle Level and Shrinkage Ratio
Sample strips are sealed under the seal parameters specified in the Heat Seal Strength test method. The sealed sample strips are aged 24 hours, under controlled environment (23±2° C., 55±5 relative humidity). Thereafter, as illustrated in FIG. 1, the shortest width of sealed area of a sample strip is measured. The shrinkage ratio is calculated by the following equation:

$$Shrinkage = (1-W_S/W_F) \times 100\%$$

wherein $W_S$ is the shortest measured width of the sample strip after heat sealing and $W_F$ is the width of the sample strip before heat sealing. The data reported in the Examples is the average of three parallel sample strips.
Wrinkle level is correlated to shrinkage ratio as follows: A shrinkage ratio of 0% is classified as "no" wrinkle. A shrinkage ratio of 10% or less is classified as "minor" wrinkle. A shrinkage ratio of >10% is classified as "severe" wrinkle.
Molecular Weight of High Density Fraction ($MW_{HDF>95}$) and High Density Fraction Index ($I_{HDF>95}$)
The polymer molecular weight can be determined directly from LS (light scattering at 90 degree angle, Precision Detectors) and the concentration detector (IR-4, Polymer Char) according to the Rayleigh-Gans-Debys approximation (A. M. Striegel and W. W. Yau, Modern Size-Exclusion Liquid Chromatography, $2^{nd}$ Edition, Page 242 and Page 263, 2009) by assuming a form factor of 1 and all the virial coefficients equal to zero. Baselines are subtracted from the LS (90 degree) and IR-4 (measurement channel) chromatograms. For the whole resin, integration windows are set to integrate all the chromatograms in the elution temperature (temperature calibration is specified above) ranging from 25.5 to 118° C. The high density fraction is defined as the fraction that has an elution temperature higher than 95.0° C. in CEF. Measuring the $MW_{HDF>95}$ and $I_{HDF>95}$ includes the following steps:
(1) Measuring the interdetector offset. The offset is defined as the geometric volume offset between LS detector with respect to the IR-4 detector. It is calculated as the difference in elution volume (mL) of the polymer peak between the IR-4 and LS chromatograms. It is converted to the temperature offset by using the elution thermal rate and elution flow rate. A high density polyethylene (with no comonomer, melting index $I_2$ of 1.0, polydispersity or molecular weight distribution $M_w/M_n$ approximately 2.6 by conventional gel permeation chromatography) is used. The same experimental conditions as the CEF method above are used except for the following parameters: crystallization at 10° C./min from 140° C. to 137° C., thermal equilibrium at 137° C. for 1 minute as the Soluble Fraction Elution Time, and elution at 1° C./min from 137° C. to 142° C. The flow rate during crystallization is 0.10 ml/min. The flow rate during elution is 0.80 ml/min. The sample concentration is 1.0 mg/ml.
(2) Each data point in the LS chromatogram is shifted to correct for the interdetector offset before integration.
(3) Molecular weight at each retention temperature is calculated as the baseline subtracted LS signal/the baseline subtracted IR4 signal/MW constant (K)
(4) The baseline subtracted LS and IR-4 chromatograms are integrated in the elution temperature range of 95.0 to 118.0° C.
(5) The Molecular weight of the high density fraction ($MW_{HDF>95}$) is calculated according to:

$$MW_{HDF>95} = \int_{95}^{118} Mw \cdot C \cdot dT / \int_{95}^{118} C \cdot dt$$

where Mw is the molecular weight of the polymer fraction at the elution temperature T and C is the weight fraction of the polymer fraction at the elution temperature T in the CEF, and $$\int_{25}^{118} C \cdot dt = 100\%$$

(6) High density fraction index ($I_{HDF>95}$) is calculated as $$I_{HDR>95} = \int_{95}^{118} Mw \cdot C \cdot dT$$

where Mw in is the molecular weight of the polymer fraction at the elution temperature Tin the CEF.

The MW constant (K) of CEF is calculated by using NIST polyethylene 1484a analyzed with the same conditions as for measuring interdetector offset. The MW constant (K) is calculated as "(the total integrated area of LS) of NIST PE1484a/(the total integrated area) of IR-4 measurement channel of NIST PE 1484a/122,000".

The white noise level of the LS detector (90 degree) is calculated from the LS chromatogram prior to the polymer eluting. The LS chromatogram is first corrected for the baseline correction to obtain the baseline subtracted signal. The white noise of the LS is calculated as the standard deviation of the baseline subtracted LS signal by using at least 100 data points prior to the polymer eluting. Typical white noise for LS is 0.20 to 0.35 mV while the whole polymer has a baseline subtracted peak height typically around 170 mV for the high density polyethylene with no comonomer, $I_2$ of 1.0, polydispersity $M_w/M_n$ approximately 2.6 used in the interdetector offset measurements. Care should be maintained to provide a signal to noise ratio (the peak height of the whole polymer to the white noise) of at least 500 for the high density polyethylene.

That which is claimed:

1. A multilayer structure comprising:
   (a) a biaxially oriented polyethylene film comprising a linear low density polyethylene having a density of 0.910 to 0.940 g/cm3, wherein the ultimate elongation in the machine direction of the biaxially oriented polyethylene film is at least 2 times greater than the ultimate elongation in the cross direction when measured according to ASTM D882, and wherein the ultimate tensile strength of the biaxially oriented polyethylene film is at least 60 MPa in at least one of the machine direction and the cross direction when measured according to ASTM D882;
   (b) an adhesive layer, wherein the adhesive layer comprises a solventless adhesive, a waterborne adhesive, or a solventborne adhesive, wherein the adhesive layer is not a tie layer during coextrusion; and
   (c) a sealant film, wherein the sealant film comprises at least one layer comprising at least 30 percent by weight of a polyolefin plastomer, a polyolefin elastomer, an ultra low density polyethylene, an ethylene acetate copolymer, an ethylene acrylic acid copolymer, or an ethylene acrylate copolymer and low density polyethylene, wherein the low density polyethylene is present in an amount of 70 percent by weight or less, wherein the ultimate elongation of the sealant film is at least 300% in at least one of the machine direction and the cross direction when measured according to ASTM D882, wherein the ultimate tensile strength of the sealant film is less than 50 MPa in at least one of the machine direction and the cross direction when measured according to ASTM D882, and wherein the sealant film has a heat seal initiation temperature of 105° C. or less; wherein the sealant film is laminated to the biaxially oriented polyethylene film by the adhesive layer.

2. The multilayer structure of claim 1, wherein a first layer of the sealant film comprises at least 50 percent by weight of a polyolefin plastomer, a polyolefin elastomer, an ultra low density polyethylene, an ethylene acetate copolymer, an ethylene acrylic acid copolymer or an ethylene acrylate copolymer.

3. The multilayer structure of claim 1, further comprising at least one of a second biaxially oriented polyethylene film, a second adhesive layer, a polyolefin-based film made by a blown, cast, or water-quench process, a biaxially oriented polyamide film, a biaxially oriented polypropylene film, a biaxially oriented glycol-modified polyethylene terephthalate, a polyvinylidene chloride film, and a foil.

4. The multilayer structure of claim 1, wherein the sealant film is a blown film or a cast film.

5. The multilayer structure of claim 1, wherein the sealant film has a heat seal initiation temperature of 95° C. or less.

6. The multilayer structure of claim 1, wherein the sealant film has a thickness of 30 to 120 microns.

7. The multilayer structure of claim 1, wherein ultimate tensile strength of the biaxially oriented polyethylene film in at least one of the machine direction or the cross direction is at least 75 MPa when measured according to ASTM D882.

8. The multilayer structure of claim 1, wherein the biaxially oriented polyethylene film further comprises at least one of a high density polyethylene, a low density polyethylene, an ultra low density polyethylene, a polyethylene plastomer, a polyethylene elastomer, an ethylene vinyl acetate copolymer, an ethylene ethyl acrylate copolymer and any polymer comprising at least 50% ethylene monomer.

9. The multilayer structure of claim 1, wherein the biaxially oriented polyethylene film has a thickness of 10 to 60 microns.

10. The multilayer structure of claim 1, wherein the biaxially oriented polyethylene film is oriented in the machine direction at a draw ratio from 2:1 to 6:1 and in the cross direction at a draw ratio from 2:1 to 9:1.

11. The multilayer structure of claim 1, wherein the multilayer structure exhibits a sealing window of at least 15° C.

12. An article comprising the multilayer structure of claim 1.

13. The multilayer structure of claim 1, wherein the sealant film is not biaxially oriented.

14. The multilayer structure of claim 1, wherein the adhesive layer is applied at up to 5.0 grams/m².

15. A multilayer structure comprising:
   (a) a biaxially oriented polyethylene film comprising a linear low density polyethylene having a density of 0.910 to 0.940 g/cm3;
   (b) an adhesive layer, wherein the adhesive layer comprises a solventless adhesive, a waterborne adhesive, or a solventborne adhesive; and
   (c) a sealant film comprising at least one layer comprising at least 30 percent by weight of a polyolefin plastomer, a polyolefin elastomer, an ultra low density polyethylene, an ethylene acetate copolymer, an ethylene acrylic acid copolymer, or an ethylene acrylate copolymer and low density polyethylene, wherein the low density polyethylene is present in an amount of 70 percent by weight or less, wherein the ultimate elongation of the sealant film is at least 300% in at least one of the machine direction and the cross direction when measured according to ASTM D882, wherein the ultimate tensile strength of the sealant film is less than 50 MPa in at least one of the machine direction and the cross direction when measured according to ASTM D882, and wherein the sealant film has a heat seal initiation temperature of 105° C. or less;

wherein the sealant film is laminated to the biaxially oriented polyethylene film by the adhesive layer.

16. An article comprising the multilayer structure of claim 15.

17. The multilayer structure of claim 15, wherein a first layer of the sealant film comprises at least 50 percent by weight of a polyolefin plastomer, a polyolefin elastomer, an ultra low density polyethylene, an ethylene acetate copolymer, an ethylene acrylic acid copolymer or an ethylene acrylate copolymer.

18. A multilayer structure comprising:
  (a) a biaxially oriented polyethylene film comprising a linear low density polyethylene having a density of 0.910 to 0.940 g/cm3;
  (b) an adhesive layer comprising a solventless adhesive, a waterborne adhesive, or a solventborne adhesive, wherein the adhesive layer is not a tie layer during coextrusion; and
  (c) a sealant film comprising at least one layer comprising at least 30 percent by weight of a polyolefin plastomer, a polyolefin elastomer, an ultra low density polyethylene, an ethylene acetate copolymer, an ethylene acrylic acid copolymer, or an ethylene acrylate copolymer and low density polyethylene, wherein the low density polyethylene is present in an amount of 70 percent by weight or less, wherein the ultimate elongation of the sealant film is at least 300% in at least one of the machine direction and the cross direction when measured according to ASTM D882, wherein the ultimate tensile strength of the sealant film is less than 50 MPa in at least one of the machine direction and the cross direction when measured according to ASTM D882, and wherein the sealant film has a heat seal initiation temperature of 105° C. or less;

wherein the sealant film is laminated to the biaxially oriented polyethylene film by the adhesive layer.

* * * * *